United States Patent [19]

Mitsuyasu et al.

[11] Patent Number: 4,688,536
[45] Date of Patent: Aug. 25, 1987

[54] DRIVE CIRCUIT FOR AN ELECTROSTRICTIVE ACTUATOR IN A FUEL INJECTION VALVE

[75] Inventors: Masaki Mitsuyasu, Susono; Takeshi Takahashi, Mishima, both of Japan

[73] Assignee: Toyota Jidosha Kabushiki Kaisha, Aichi, Japan

[21] Appl. No.: 875,668

[22] Filed: Jun. 18, 1986

[30] Foreign Application Priority Data

Jun. 28, 1985 [JP] Japan ............................. 60-140417
Jul. 1, 1985 [JP] Japan ............................. 60-142418
Jul. 17, 1985 [JP] Japan ............................. 60-156034
Apr. 23, 1986 [JP] Japan ............................. 61-92254

[51] Int. Cl.$^4$ .......................... F02D 41/20; H01L 41/08
[52] U.S. Cl. .................................... 123/490; 123/446; 310/317
[58] Field of Search ............... 123/472, 478, 490, 446; 310/316, 317, 318

[56] References Cited

U.S. PATENT DOCUMENTS 3,500,799  3/1970  Benson et al.
3,575,146  4/1971  Creighton et al. ............ 123/299
4,127,087 11/1978  Caves ............................ 123/490
4,469,974  9/1984  Speranza ..................... 123/494 X
4,499,878  2/1985  Igashira et al.
4,535,743  8/1985  Igashira et al. .............. 123/478 X
4,537,353  8/1985  Speranza ..................... 123/494 X

OTHER PUBLICATIONS

"Piezomotors–Electromechanical Muscle", SAE Technical Paper Series 800502, Feb. 1980.

*Primary Examiner*—Tony M. Argenbright
*Attorney, Agent, or Firm*—Parkhurst & Oliff

[57] ABSTRACT

In a drive circuit for electrostrictive actuators provided to fuel injection valves in an internal combustion engine, the drive circuit is constituted by a capacitor connected to a direct current voltage source; a switching element connected to the capacitor and used for charging; a first inductor connected to the switching element and used for charging; a plurality of piezoelectric elements used as the electrostrictive actuator; a plurality of other switching elements each connected to each of the piezoelectric elements and used for discharging; a plurality of diodes each connected to each of the piezoelectric elements and used for clamping; and a second inductor connected to each of the piezoelectric elements through each of the switching elements and used for discharging; wherein, at the time of charging, all of the piezoelectric elements are simultaneously charged by turning ON the switching element for charging, and at the time of discharging, predetermined piezoelectric elements are sequentially discharged in correspondence with a fuel injection timing.

8 Claims, 8 Drawing Figures

DRIVE CIRCUIT FOR AN ELECTROSTRICTIVE ACTUATOR IN A FUEL INJECTION VALVE

BACKGROUND OF THE INVENTION

1. Field of the Invention

The present invention relates to a drive circuit for an electrostrictive actuator provided to a fuel injection valve in an internal combustion engine, i.e., gasoline or diesel engine.

2. Description of the Related Art

A conventional technique is known regarding the fuel injection valve control using an electrostrictive actuator. In general, the electrostrictive actuator is constituted by a plurality of pellet type piezoelectric elements laminated in the form of a cylinder. Usually, a type of ceramic mainly containing titanate zirconate lead is used as the piezoelectric element (so-called PZT element). This piezoelectric element has an important feature that makes it widely utilized for mechanical-electrical conversion or electrical-mechanical conversion. That is, when an electric field is applied in the longitudinal direction of the piezoelectric element, the thickness of the element is rapidly expanded by a small amount. Conversely, when the electric field is removed, the thickness of the element is rapidly contracted to the original state.

Accordingly, control of the fuel injection valve is performed by utilizing this characteristic of the piezoelectric element used as the electrostrictive actuator. In this case, it is necessary to provide a drive circuit for controlling the actuator by supplying a direct current (DC) voltage to the piezoelectric element. The drive circuit is constituted by at least one capacitor for charging, an inductor used at the time of charging, a switching element for control of the charge and discharge, and a diode for clamping. The drive circuit is, in general, provided to each actuator, and the actuator is provided to each fuel injection valve.

There are, however, some variations in the electrical characteristic of each of these parts, particularly, the inductors, and these variations cause fluctuations in the timing and stroke of the expansion and contraction of the piezoelectric element, which result in an imperfect control of a fuel injection.

SUMMARY OF THE INVENTION

The object of the present invention is to provide a simplified drive circuit for an electrostrictive actuator in a fuel injection valve by reducing the number of electrical parts required, thereby eliminating variations in characteristic of each part and enabling an optimal control of fuel injection through the electrostrictive actuator.

In accordance with one aspect of the present invention, there is provided a drive circuit for electrostrictive actuators provided to fuel injection valves in an internal combustion engine including: a capacitor connected to a direct current voltage source, a switching element connected to the capacitor and used for controlling the time of charging of piezoelectric elements; a first inductor connected to the switching element and used at the time of charging of the piezoelectric elements; a plurality of piezoelectric elements used as the electrostrictive actuator; a plurality of other switching elements each connected to each of the piezoelectric elements and used for controlling the time of discharging of the piezoelectric elements; a plurality of diodes each connected to each of the piezoelectric elements and used for clamping; and a second inductor connected to each of the piezoelectric elements through each of the switching elements and used at the time of discharging of the piezoelectric elements; wherein, at the time of charging, all of the piezoelectric elements are simultaneously charged by turning ON the switching element for controlling the time of charging, and at the time of discharging, predetermined piezoelectric elements are sequentially discharged in correspondence with the fuel injection timing.

In accordance with another aspect of the present invention, there is provided a drive circuit for electrostrictive actuators provided to fuel injection valves in an internal combustion engine including: a capacitor connected to a direct current voltage source; a first inductor connected to the capacitor and used at the time of charging of a piezoelectric element; a plurality of piezoelectric elements used as the electrostrictive actuator; a plurality of switching elements each connected to each of the piezoelectric elements and used to control the time of charging of the piezoelectric element; a plurality of diodes each connected to each of the piezoelectric elements and used for clamping; a second inductor connected to each of the piezoelectric elements through each of the diodes and used at the time of discharging of the piezoelectric elements; and another switching element connected to the second inductor and used for control of the time of discharging of the piezoelectric elements; wherein, at the time of discharging, all of the piezoelectric elements are simultaneously discharged by turning ON the switching element for controlling the time of discharging, and at the time of charging, predetermined piezoelectric elements are sequentially charged in correspondence with a fuel injection timing.

DESCRIPTION OF THE PREFERRED EMBODIMENTS

Before describing the preferred embodiments, an explanation will be given of a conventional drive circuit for an electrostrictive actuator.

Figure 1:
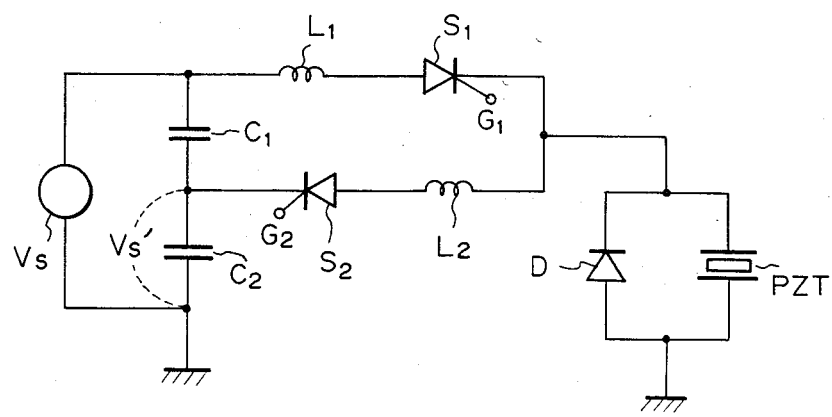
FIG. 1 is a circuit diagram of a conventional drive circuit for an electrostrictive actuator.

Referring to FIG. 1, Vs represents a direct current voltage source, $C_1$ a charging capacitor, $C_2$ a discharging capacitor, $L_1$ an inductor used at the time of charging (hereinafter, charge time inductor), $L_2$ an inductor used at the time of discharging (hereinafter, discharge time inductor), $S_1$ a charging thyristor, $S_2$ a discharging thyristor, D a diode for clamping, and PZT a piezoelectric element. When a trigger pulse is input to a gate $G_1$ of the charging thyristor $S_1$, the charging thyristor $S_1$ is turned ON and the PZT is charged. In this case, since a resonance circuit is formed by the charging capacitor $C_1$, the charge time inductor $L_1$, the charging thyristor $S_1$, and the piezoelectric element PZT, approximately double strength voltage (2 Vs) can be generated in both ends of the charge time inductor $L_1$. This voltage (2 Vs) is supplied to the PZT and the PZT is expanded in the longitudinal direction (thickness direction). When another trigger pulse is input to a gate $G_2$ of the discharging thyristor $S_2$, the discharging thyristor $S_2$ is turned ON and the PZT is discharged through the discharge time inductor $L_2$. The PZT is then contracted to the original thickness.

The electrostrictive actuator can be driven in correspondence with the expansion and contraction of the piezoelectric element PZT. Thus, the movement of a nozzle needle in the fuel injection valve can be controlled in response to this expansion and contraction so that the fuel injection timing and quantity also can be controlled by the movement of the electrostrictive actuator.

There are, however, some problems in the use of this method for a plurality of fuel injection valves. Namely, it is necessary to provide this drive circuit to every actuator, i.e., every fuel injection valve. For example, when the engine is constituted by four cylinders, four drive circuits become necessary because there are four fuel injection valves. It is difficult, however, to provide a drive circuit having a uniform electrical characteristic between each of the circuits, because the thyristors and inductors always have predetermined variations in their electrical characteristics. These variations cause fluctuations in the timing and stroke of the expansion and contraction of the piezoelectric element PZT and result in an imperfect control of the fuel injection.

A drive circuit for an electrostrictive actuator provided to a fuel injection valve in an internal combustion engine will be explained in detail hereinafter as an embodiment of the present invention.

Figure 2:
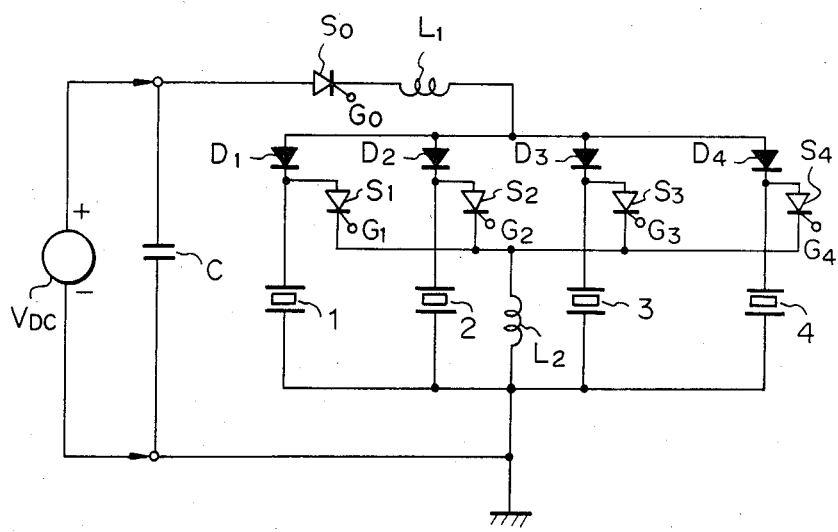
FIG. 2 is a circuit diagram of a drive circuit according to an embodiment of the present invention.

Referring to FIG. 2, this drive circuit is used in common to all actuators. In this case, only one charge time inductor $L_1$ is provided as a first inductor and only one discharge time inductor $L_2$ is provided as a second inductor. These inductors $L_1$ and $L_2$ are used in common to all actuators. Reference numbers 1 to 4 represent piezoelectric elements provided to each actuator. The thyristor as the switching element $S_0$ is connected in series to the charge time inductor $L_1$. Four thyristors as the switching elements $S_1$ to $S_4$ are provided to each actuator 1 to 4. "$V_{DC}$" represents a direct current voltage source, "C" a charging capacitor, and diodes $D_1$ to $D_4$ are used for clamping abnormal voltage due to the reversed electric field.

Figure 3:
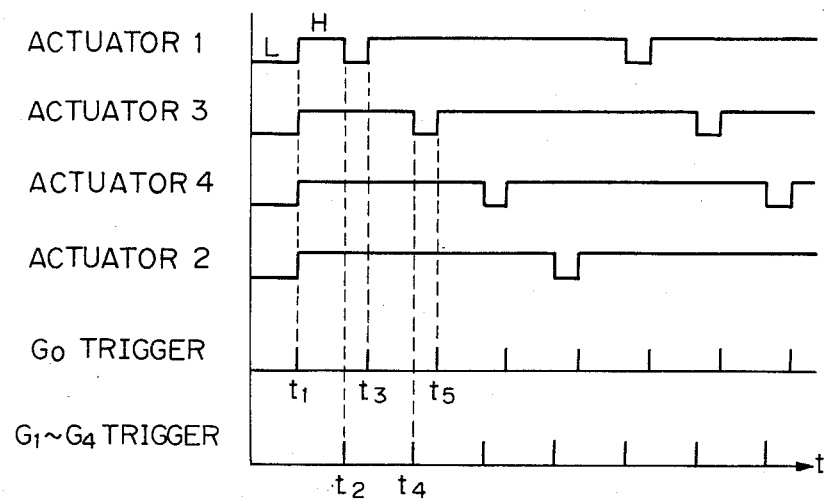
FIG. 3 is a timing chart for explaining actuator operations shown in FIG. 2.

The operation of the circuit in FIG. 2 is explained with reference to FIG. 3.

When a trigger pulse is input to a gate $G_0$ of the thyristor $S_0$, the thyristor $S_0$ is turned ON and all of the piezoelectric elements 1 to 4 are simultaneously charged through the diodes $D_1$ to $D_4$. In this case, since a resonance circuit is formed by the direct current voltage source $V_{DC}$, the thyristor $S_0$, the charge time inductor $L_1$, and the piezoelectric element 1 (or 2, 3, 4), an approximately double strength voltage (2 $V_{DC}$) can be generated in both ends of the charge time inductor $L_1$. This voltage is supplied to all of the piezoelectric elements at the time $t_1$ and each of the PZT elements is expanded in the longitudinal direction (thickness direction). When the actuator is expanded, the fuel injection is not performed, as explained below. Accordingly, at this stage, no fuel injections are performed. Next, at the time $t_2$, the trigger pulse is applied to a gate $G_1$ of the thyristor $S_1$ so that the thyristor $S_1$ is turned ON. When the thyristor $S_1$ is turned ON, the piezoelectric element 1 is discharged and the actuator is contracted to start the fuel injection, as explained below. In this case, the thyristor $S_0$ is turned OFF when the thyristor $S_1$ is turned ON. The same process as above is sequentially performed regarding the other actuators 2, 3, and 4. As explained above, since only one charge time inductor $L_1$ and one discharge time inductor $L_2$ are used for control of the actuator, variations in the electric characteristic of each parts can be completely eliminated and a proper control of the fuel injection can be achieved.

Figure 4:
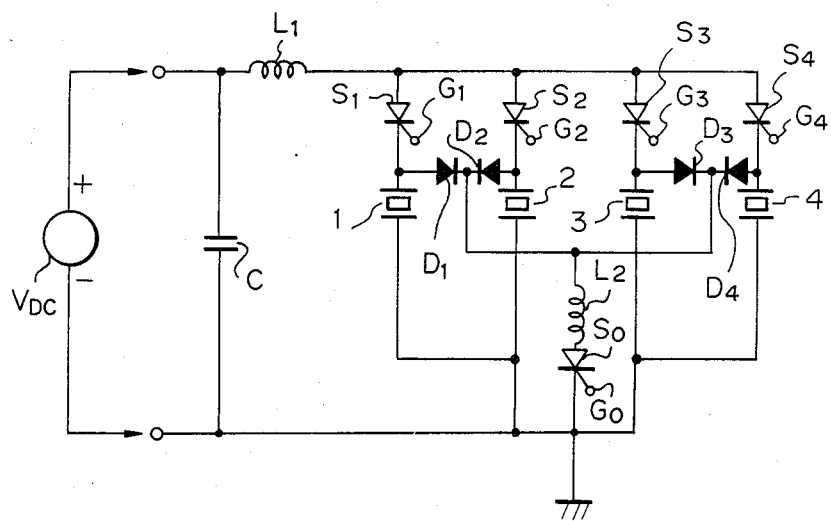
FIG. 4 is a circuit diagram of a drive circuit according to another embodiment of the present invention.
Figure 5:
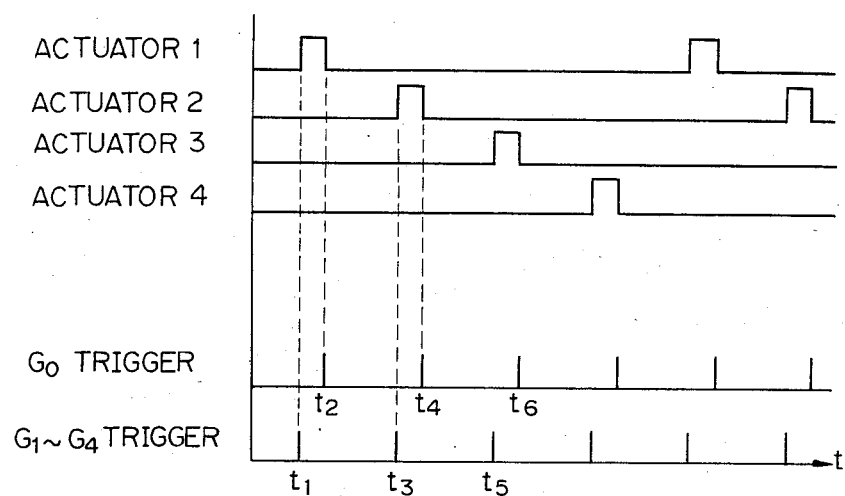
FIG. 5 is a timing chart for explaining actuator operations shown in FIG. 4.

Referring to FIG. 4, the thyristor $S_0$ is provided to the discharge side. In this case, as shown in FIG. 5 when the thyristor $S_0$ is turned ON, all of the piezoelectric elements are simultaneously discharged and all of the actuators are contracted. When the thyristor $S_1$ is turned ON, the piezoelectric element 1 is charged and the actuator 1 is expanded. In this case, since a resonance circuit is formed by the direct current voltage source $V_{DC}$, the inductor $L_1$, the thyristor $S_1$, and the piezoelectric element 1, an approximately double strength voltage ($2V_{DC}$) can be generated at both ends of the inductor $L_1$. The same process as above is sequentially performed for the other actuators 2, 3, and 4. In this type of fuel injection, when the piezoelectric element is discharged, i.e., is contracted, the fuel injection is not performed, contrary to first embodiment. Namely the fuel injection is performed when the piezoelectric element is charged, i.e., is expanded, as explained below.

Figure 6:
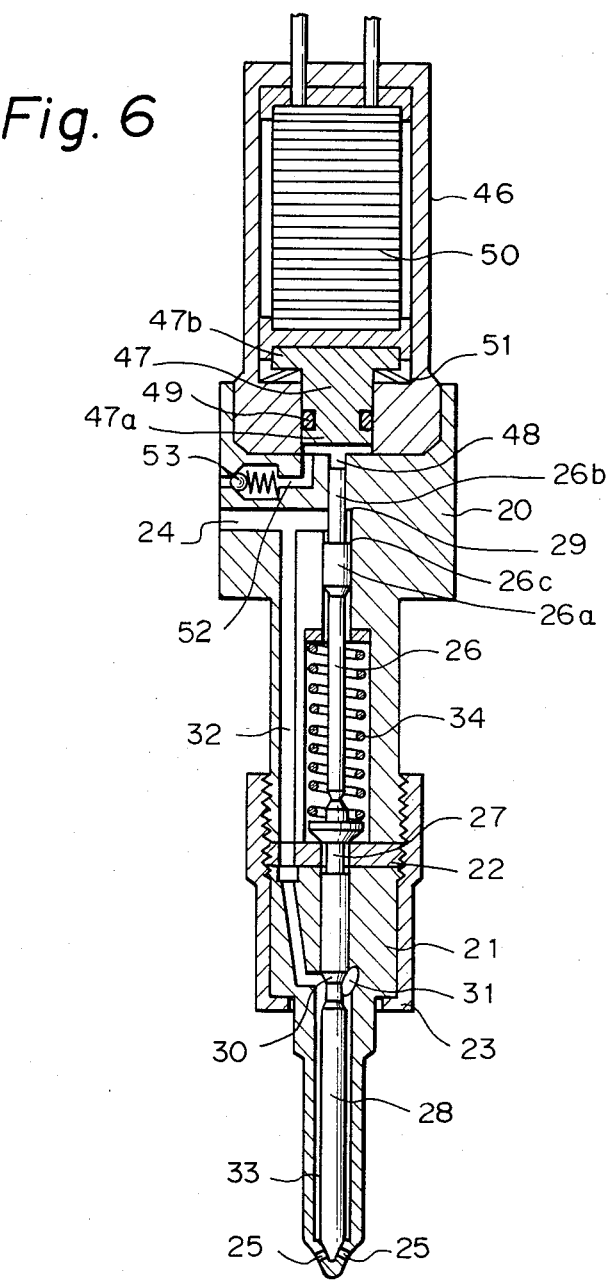
FIG. 6 is a cross-sectional view of a fuel injection valve used for the drive circuit shown in FIG. 2.

Referring to FIG. 6, this type fuel injection valve is used for the drive circuit shown in FIG. 2. In FIG. 6, 20 represents an injection body, 21 a nozzle, 22 a spacer, 23 a nozzle holder, 24 a fuel passage, 25 nozzle holes, 26 a control rod (large diameter 26a, small diameter 26b, pressure surface 26c), 27 a pin, 28 a needle, 29 a fuel chamber, 30 a pressure surface, 31 a needle pressure chamber, 32 and 33 fuel passages, 34 a spring, 46 a casing, 47 an oil pressure piston (small diameter 47a, large diameter 47b), 48 a control rod pressure chamber, 49 and "O" ring, 50 a piezoelectric element, 51 a spring, 52 a fuel passage, and 53 a valve.

In this structure, when the DC voltage is supplied to the piezoelectric element 50 (this element corresponds to the piezoelectric elements 1 to 4 shown in FIG. 2) through the capacitor, the piezoelectric element is charged and expanded in the longitudinal direction. As this expansion quantity is above 50 μm at most, the response time is very short, i.e., about 80μ seconds. When the voltage supply is stopped, the piezoelectric element is contracted with very short response time. In this timing, the pressurized fuel is fed into the fuel passage 24 and injected from nozzle holes 25. Basically, control of the fuel injection timing is based on the movement of the needle 28 for opening or closing the nozzle holes 25. The needle 28 is constantly biased toward the holes 25 by the spring 34 and the actuator 50. Accordingly, when the fuel pressure exceeds the valve opening pressure at the end of the needle 28, the fuel is injected from the holes 25.

When the actuator 50 is expanded, the oil pressure piston is pushed down and the pressure of the chamber 48 is raised. When the pressure is raised, the control rod 26 and the needle 28 are pushed down so that the fuel injection is stopped. When the actuator 50 is contracted, only a spring force pressure is applied to the needle so that the fuel pressure exceeds the valve opening pressure, then the fuel injection is started.

Figure 7:
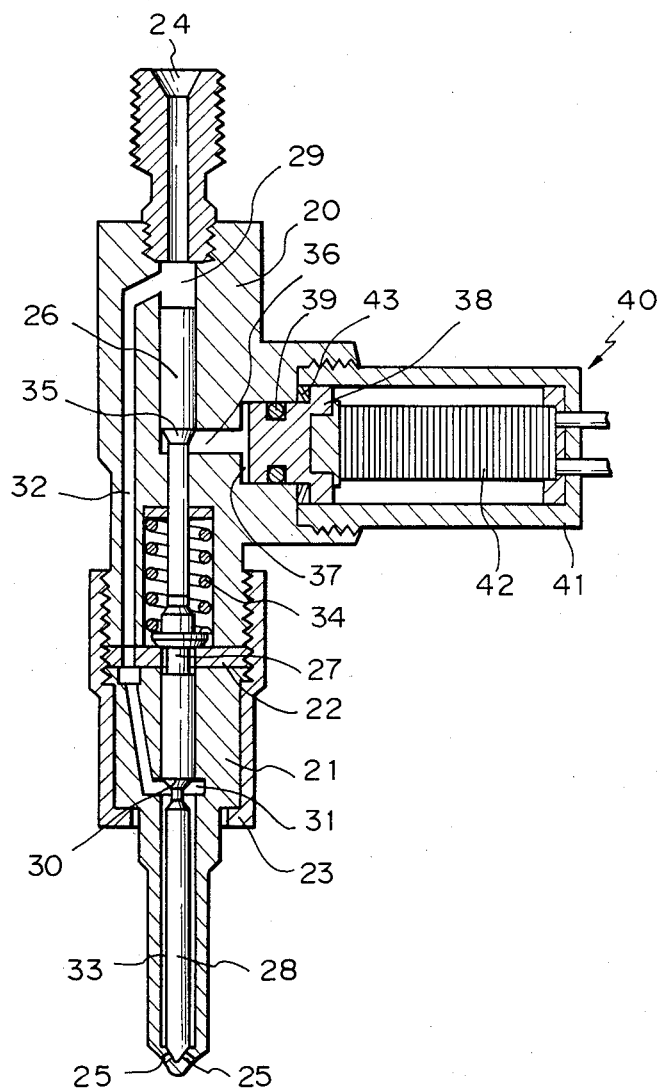
FIG. 7 is a cross-sectional view of a fuel injection valve used for the drive circuit shown in FIG. 4.

Referring to FIG. 7, this type of fuel injection valve uses the drive circuit shown in FIG. 4, and the same reference members are attached to the same components as shown in FIG. 6. In FIG. 7, 35 represents a pressure surface, 36 a control rod pressure chamber, 37 a cylinder, 38 a piston, 39 an "O" ring, 40 an actuator body, 41 a casing, and 42 a piezoelectric element.

As can be seen from the drawing, the actuator 40 is provided in a direction transversal to the needle axis. When the actuator 42 is contracted, the pressure in the chamber 36 becomes weak so that the pressure based on the fuel pressure and the spring force is directly applied to the needle 28. Accordingly, since the holes 25 are closed by the needle 28, the fuel injection is stopped. When the actuator is expanded, the pressure in the chamber 36 is raised so that the control rod 26 is raised. Accordingly, the pressure at the needle becomes weak and the fuel pressure exceeds the valve opening pressure, and then the fuel injection is started.

Figure 8:
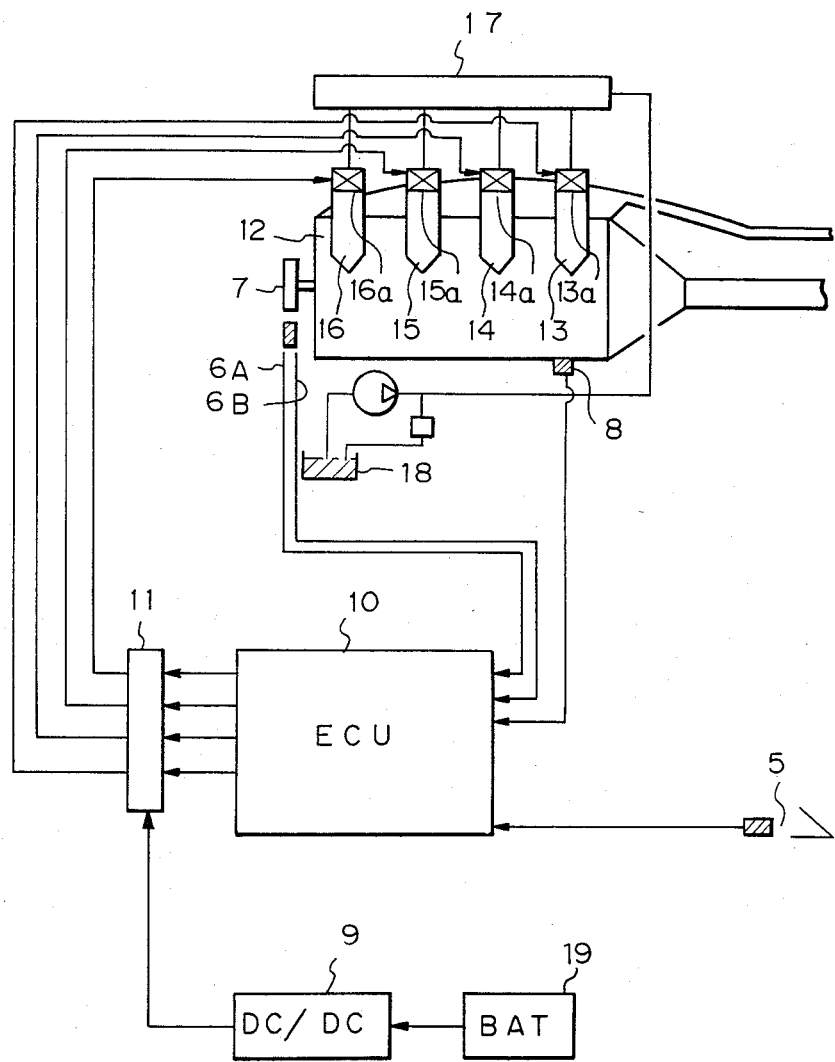
FIG. 8 is a schematic block diagram of an engine and a control system.

Referring to FIG. 8, 5 represents an accelerator pedal sensor, 6A and 6B crank angle sensors, 7 a crank shaft, 8 a water temperature sensor, 9 a DC/DC convertor, 10 an electric control unit (ECU), 11 a drive circuit according to the present invention, 12 a diesel engine body, 13 to 16 fuel injection valves, 13a to 16a electrostrictive actuators, 17 a reserve tank, and 18 a fuel tank.

In this structure, signals detected by the sensors 5, 6A, 6B and 8 are input to the ECU10. The ECU10 generates predetermined signals for turning each thyristor ON/OFF. Each of the thyristors $S_0$ to $S_4$ in the drive circuit 11 is turned ON/OFF based on the fuel injection control procedure. This fuel injection control procedure is stored in a memory of the ECU.

We claim:

1. A drive circuit for electrostrictive actuators provided to fuel injection valves in an internal combustion engine comprising:
    a capacitor connected to a direct current voltage source;
    a switching element connected to said capacitor and used for controlling the time of charging of piezoelectric elements;
    a first inductor connected to said switching element and used at the time of charging of the piezoelectric elements;
    a plurality of piezoelectric elements used as said electrostrictive actuator;
    a plurality of other switching elements each connected to each of said piezoelectric elements and used for controlling the time of discharging of the piezoelectric elements;
    a plurality of diodes each connected to each of said piezoelectric elements and used for clamping; and
    a second inductor connected to each of said piezoelectric elements through each of said switching elements and used at the time of discharging of the piezoelectric elements;
    wherein at the time of charging all of said piezoelectric elements are simultaneously charged by turning ON said switching element for controlling the time of charging, and at the time of discharging, predetermined piezoelectric elements are sequentially discharged in correspondence with a fuel injection timing.

2. A drive circuit as claimed in claim 1, wherein all of said switching elements comprise thyristors.

3. A drive circuit as claimed in claim 1, wherein said direct current voltage source, said first inductor and all of said piezoelectric elements constitute a resonance circuit at the time of charging of the resonance piezoelectric elements.

4. A drive circuit as claimed in claim 1, wherein said second inductor and each of said piezoelectric elements constitute a resonance circuit at the time of discharging of the piezoelectric elements.

5. A drive circuit for electrostrictive actuators provided to fuel injection valves in an internal combustion engine comprising:
    a capacitor connected to a direct current voltage source;
    a first inductor connected to said capacitor and used at the time of charging of a piezoelectric element;
    a plurality of piezoelectric elements used as said electrostrictive actuator;
    a plurality of switching elements each connected to each of said piezoelectric elements and used for controlling the time of charging of the piezoelectric element;
    a plurality of diodes each connected to each of said piezoelectric elements and used for clamping;
    a second inductor connected to each of said piezoelectric element through each of said diodes and used at the time of discharging of the piezoelectric elements; and
    another switching element connected to said second inductor and used for controlling the time of discharging of the piezoelectric elements;
    wherein at the time of discharging all of said piezoelectric elements are simultaneously discharged by turning ON said switching element for controlling the time of discharging, and at the time of charging, predetermined piezoelectric elements are sequentially charged in correspondence with a fuel injection timing.

6. A drive circuit as claimed in claim 5, wherein all of said switching elements comprise thyristors.

7. A drive circuit as claimed in claim 5, wherein said direct current voltage source, said first inductor and each of said piezoelectric elements constitute a resonance circuit at the time of charging of the piezoelectric element.

8. A drive circuit as claimed in claim 5, wherein said second inductor and all of said piezoelectric elements constitute a resonance circuit at the time of discharging of the piezoelectric elements.

* * * * *